United States Patent [19]
McNeill

[11] Patent Number: 5,482,137
[45] Date of Patent: Jan. 9, 1996

[54] TREE STAND

[76] Inventor: Thomas L. McNeill, 406 S. Fourth St., Smithfield, N.C. 27577

[21] Appl. No.: 107,585
[22] Filed: Aug. 18, 1993
[51] Int. Cl.$^6$ .................................................. A01M 31/02
[52] U.S. Cl. ............................................ 182/187; 182/136
[58] Field of Search ................................... 182/187, 188, 182/116, 129, 134–136, 113

[56] References Cited

U.S. PATENT DOCUMENTS

| | | | |
|---|---|---|---|
| 3,352,379 | 11/1967 | Riggs | 182/187 X |
| 4,368,800 | 1/1983 | Campbell | 182/133 X |
| 5,009,283 | 4/1991 | Prejean | 182/187 X |
| 5,131,496 | 7/1992 | White | 182/187 |

*Primary Examiner*—Alvin C. Chin-Shue
*Attorney, Agent, or Firm*—John G. Mills and Associates

[57] ABSTRACT

This invention is a climbing type tree stand having a seat bracket swively mounted thereon with a seat rotatively mounted at the end of such bracket to allow said chair to be turned 360° whereby less interior space is required within said stand than would be required for a rotatable chair that is not swively mounted. An elevated rail system is also mounted on the stand and acts as both a guard rail and a gun support means. Either one, two or three pairs of removable wheels are provided for moving the stand to and from its use location and to allow the same to also be used as a big game carrier.

7 Claims, 4 Drawing Sheets

TREE STAND

FIELD OF INVENTION

This invention relates to tree stands and more particularly to elevated tree stands for mounting on vertical support means.

When hunting deer and other animals it has always been important for the hunter to be at a concealed location which is commonly known as a stand. As the hunting of deer and other big game has become more popular, it has been noted that these animals rarely will sense danger from an elevated position since their natural predators do not attack from above.

Once recognizing the advantages of hunting from elevated positions, various means for reaching these locations and being comfortable in what are known as tree stands have been developed. These include steps which either screw into a tree or pole or clamp around the same. Also tree climbing spikes that are attached to the boots of the hunter, similar to linemen utility pole climbing spikes, have been used. The screwing of steps to live trees as well as the use of climbing spikes can injure the trees and on occasion, by penetrating the bark of the tree, pine beetles and other insects can invade the interior and can even kill the same.

Tall ladders have also been used, often folding for easy transport. These ladders can either be connected to the tree or can be self supporting with three or more legs. These devices, however, are difficult to transport, particularly through thick brush, are relatively expensive, and can be dangerous to ascend and descend primarily because there are no safety harnesses or belts associated therewith.

Climbing tree stands have been developed which have various means for encircling a tree or other vertical support, usually with a pair of such means being used together where the upper one is moved up and then the lower member follows until the desired height is reached.

Once at the desired height, however, the hunter must determine in which direction to face and moving to a different direction can not be readily accomplished. Also safety belts are a necessity for a majority of stands since the hunter is not otherwise prevented from slipping and falling either after firing his gun, falling asleep, or simply a misstep. A fall from 30 or 40 feet, of course, can result in serious injury or even death.

BRIEF DESCRIPTION OF INVENTION

After much research and study into the above mentioned problems, the present invention has been developed to provide an improved stand which can be readily transported to its use site, can be assembled for tree or pole climbing and, once in position, gives the user thereof a view and shooting radius of 360° remaining seated. Safety is assured by guardrails which double as a gun supports for making more accurate shots.

In addition to the above, the present invention incorporates an anti-fall device which, should the stand become disengaged from its support, will prevent what is known as the free fall phenomena where the stand does not re-engage said support as it drops.

A waterproof cover as well as a camouflage blind curtain are also provided for greater comfort and stealth of the user.

Once a deer or other large game have been killed, the stand can be readily and safely lowered to the ground. Wheels are then attached and the device can serve as a game carrier.

DISCUSSION OF PRIOR ART

The following references represent the closest prior art of which the inventor is aware and is intended to meet the requirements of 37 CFR 1.98 for Information Disclosure Statements.

List of References

*Cabela's Fall Hunting Preview* 1992, pages 90 through 93.

*Gander Mountain Fall Mid-Season Catalog*, pages 204 and 206 through 211.

*The Cabela's Fall Hunting Preview Catalog* discloses a number of tree climbing stands such as Tree Climber, EC-40453-004; Cottonwood Tree Stand, EC-41431-000; The Osage, EC-40412-008; The Back Adjuster, EC-40414-002. Also on page 92 is shown Summit Climbing Tree Stand EC-45512-001 and Port-A-Climb Tree Stand EC-45514-000.

Also various seat configurations are shown by the various references including the Cottonwood Tree Stand E-41431-000 on page 91 of *Cabela's Catalog* which shows a seat that can be either faced toward the tree or faced away from the tree. Also railings are shown for safety purposes as well as gun rests such as the Sentinel Tower EC-40413-0012. This stand also has an optional blind EC-45239-101.

Additional climbing tree stands are disclosed in the *Gander Mountain Catalog*. Of particular interest is the Trophy Lite Climbing Tree Stand 195K9318 which shows both how the climbing tree stand works as well as a seat that either faces the tree or faces away from the tree as clearly illustrated on page 207. On page 208 the Cottonwood Tree Stand is again shown but with inserts that show the hunter facing away from the tree and facing toward the tree, item 195K9520.

Finally, two game carriers are shown on page 204, namely item 195K7500 and 195K7501. The former having a single wheel while the latter having two opposed wheels.

OBJECT OF INVENTION

In view of the above it is an object of the present invention to provide an improved climbing tree stand with protective means that eliminates the need for safety straps.

Another object of the present invention is to provide an elevated tree stand with a swivel mounted rotating seat that allows shooting in a 360° radius in one smooth movement without seat adjustments being necessary.

Another object of the present invention is to provide a combination climbing tree stand, safety guardrails, camouflage enclosure and a swivel mounted rotating seat for a compact 360° shooting radius.

Another object of the present invention is to provide a climbing tree stand that can be transported on either two, four or six wheels and can double as a game carrier.

Another object of the present invention is to provide a combination tree stand and game carrier with at least six wheels that can be readily turned due to a differential in the height of the end wheels relative to the center wheels.

Another object of the present invention is to provide a tree stand that is readily assemblable and disassemblable as well as being readily portable.

Another object of the present invention is to provide in a tree stand, a swivelable, rotatable seat for 360° viewing.

DETAILED DESCRIPTION OF INVENTION

Figure 1:
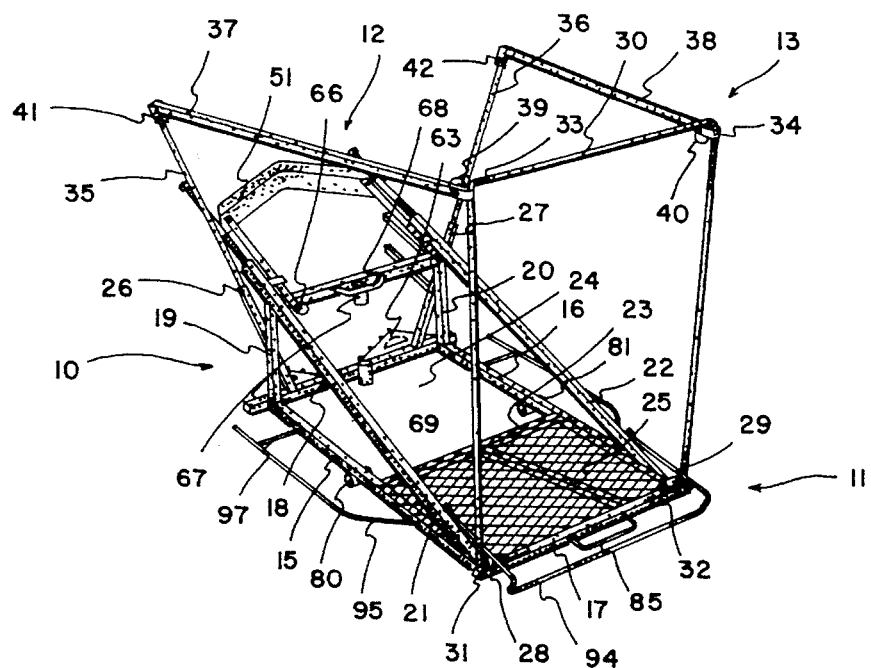
FIG. 1 is a perspective view of the improved tree stand of the present invention in use position but without the swivel seat mount thereon.

With further reference to the drawings, the improved tree stand of the present invention, indicated generally at 10, includes a base frame portion, indicated generally at 11, a vertical support or tree engaging portion, indicated generally at 12, a guard rail portion, indicated generally at 13, and a seat assembly indicated generally at 14.

The base frame 11 includes two generally parallel side frames 15 and 16 secured at their ends, by weldment or other suitable means, to front and rear frames 17 and 18. These end frames are hollow so that wheel axles can be passed therethrough as will hereinafter be described in greater detail.

A pair of uprights 19 and 20 are secured, by weldment or other suitable means, to the corner junctures of each of the side frames 16 and 15 and rear frame 18.

Support frames 21 and 22 are secured at one end, by weldment or other suitable means, to the corner junction between side frames 15 and 16 and front frame 17. The other end of the respective support frames are secured, by weldment or other suitable means, to the upper ends of respective uprights 19 and 20 as can clearly be seen in FIG. 1.

A central cross frame 23 is secured at opposite ends to side frames 15 and 16, by weldment or other suitable means. The area outlined by cross frame 23, rear frame 18 and a portion of side frames 15 and 16 define an access opening 24 for entering and exiting the stand when it is mounted on a vertical support.

The area between cross frame 23, front frame 17 and the portions of side frames 15 and 16 therebetween is covered with a suitable material such as expanded metal for light weightness and see through ability. This expanded metal is secured to the respective frames, by weldment or other suitable means, to form an expanded metal platform 25.

A railing support tube 26 and 27 are provided adjacent each of the respective uprights 19 and 20 and are secured thereto and to rear frame 18 by weldment or other suitable means.

A pair of generally horizontally disposed rail/handle engaging tubes 28 and 29 are provided on the upper surface of the front frame 17 and are secured thereto by weldment or other suitable means.

A generally U-shaped rail/handle is provided with inwardly extending end portions 31 and 32 for pivoting engagement with tubes 28 and 29 mounted on front frame 17.

Adjacent the outermost portions of rail/handle 30 from end frame 17 are a pair of rail support flanges 33 and 34. Rear rail uprights 35 and 36 are adapted to the telescopically placed in rail support tubes 26 and 27, respectively. Side guard rails 37 and 38 are adapted to be secured, respectively, to support flanges 33 and 34 by suitable means such as quick release pins 39 and 40. Since pins of this type are well known to those skilled in the art, further detailed discussion of the same is not deemed necessary.

On the ends of side rails 37 and 38, opposite their connections to flanges 33 and 34, are pivot joints 41 and 42, respectively. These pivot joints are also connected to the upper ends of rear rail uprights 35 and 36, respectively, whose opposite ends are mountingly disposed within engaging tubes 26 and 27 as clearly shown in FIG. 1.

When the respective side rails 37 and 38 are disconnected from rail support flanges 33 and 34, and rear rail uprights 35 and 36 are removed from their respective rail support tubes 26 and 27, the paired side and rear rails can be folded parallel to each other for easy storage.

Generally U-shaped safety stops 43 and 44 are secured to the interior edges of support frames 21 and 22, respectively. Safety bars 45 and 46 are adapted to be slidingly received by the respective safety stops 43 and 44. Quick release pins 47 and 48 are adapted to be inserted into openings 49 and 50 of safety bars 45 and 46, respectively.

The ends of safety bars 45 and 46, opposite openings 49 and 50, are secured to a behind tree angle bar 51 by suitable means such as bolts 52 and 53. Threaded rods 54 and 55 are secured to and outwardly project from support frames 21 and 22, respectively. Sleeves 56 and 57 are secured, by weldment or other suitable means, to the opposite ends of angle bar 51 and are adapted to slide over their respective threaded rods 54 and 55. Pairs of nuts 58 and 59 are provided on opposite ends of sleeves 56 and 57 so that, once the tree stand 10 of the present invention is disposed at the desired height, said pairs of nuts can be adjusted up and down their respective threaded rods 54 and 55 to level the stand with the base frame portion 11 being disposed generally horizontally.

Stop means, such as nuts 60 and 61, are provided on the outer ends of each of the threaded rods 54 and 55 so that the angle bar 51 cannot be accidentally threaded off the ends thereof.

A plurality of teeth 62 aide provided on stand support engaging plate 63 which is secured, by weldment or other means, to rear frame 18. The bind between angle bar 51 and engaging plate 63 will drive teeth 62 into the upright support 64 on which the stand 10 is mounted. The more weight placed on the stand, particularly the outer extremities thereof, the tighter the binding hold between bar 51 and plate 63 will be thus assuring that the stand provides a steady, safe platform for the user 65 thereof.

An upper frame member 66 is secured to the upper ends of uprights 19 and 20 by weldment or other suitable means. A pair of axially aligned, generally vertically disposed sockets are provided. The upper socket 67 is secured, by weldment or other suitable means, to the central portion of upper frame 66. A reinforcing bail 68 is also secured to upper frame member 66 and to socket 67, by weldment or other suitable means; to make certain that said socket does not separate from said upper frame member during use of the stand of the present invention.

A lower socket 69 is secured, by weldment or other suitable means, to the central portion of rear frame 18.

A seat bracket, indicated generally at 70, is composed of a generally horizontal disposed upper member and an angly disposed lower member 72. The upper and lower members join and are secured to seat socket 73. A reinforcing, generally vertically disposed member is also provided. Axially aligned, downwardly disposed pivot rods 73 and 76 are provided on the ends, opposite seat socket 73 of upper and lower members 71 and 72, respectively, and are adapted to pivotively engaged upper and lower sockets 67 and 69.

Seat 77 includes a mounting base 78 with a downwardly disposed rod 79 which is adapted to rotatively engage seat socket 73 of seat bracket 70.

Figure 2:
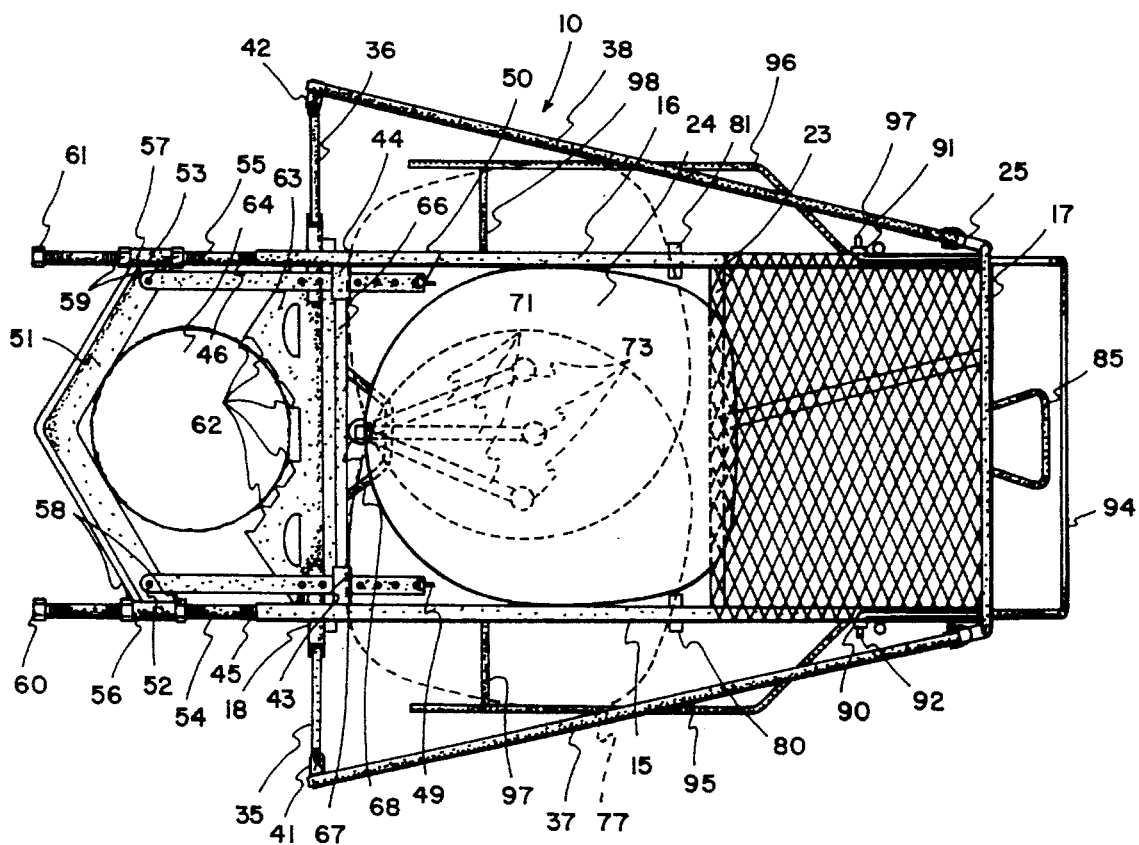
FIG. 2 is a top plan view of the stand of the present invention with its rotating swivel seat shown in various positions.
Figure 3:
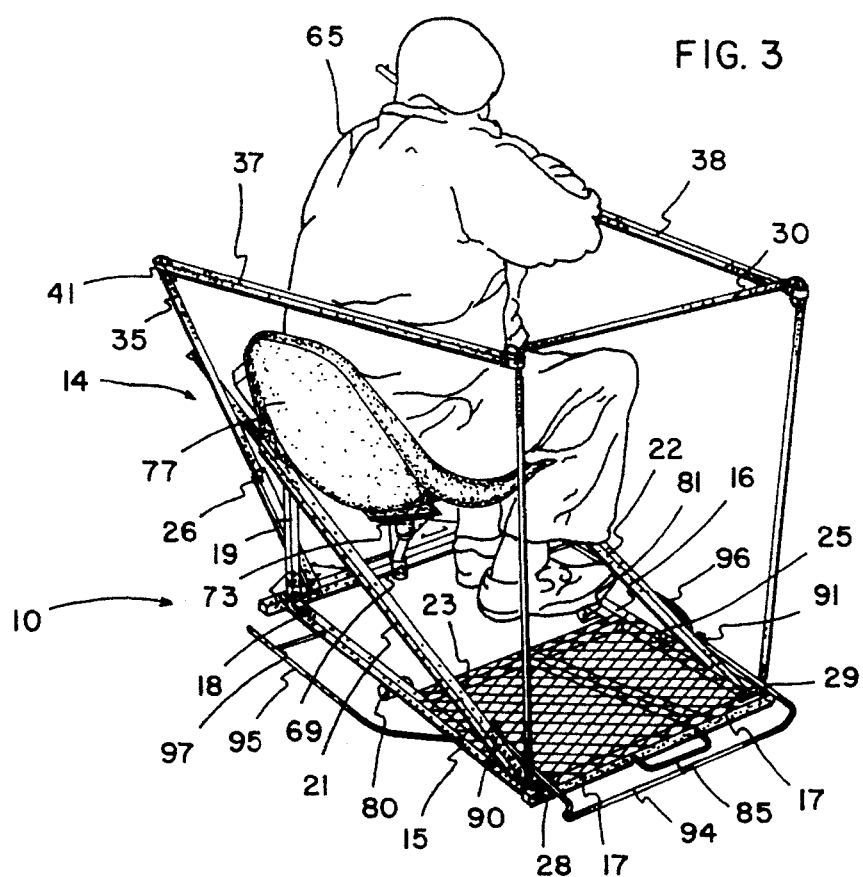
FIG. 3 is a perspective view of the present invention in use with the user facing to the right.
Figure 4:
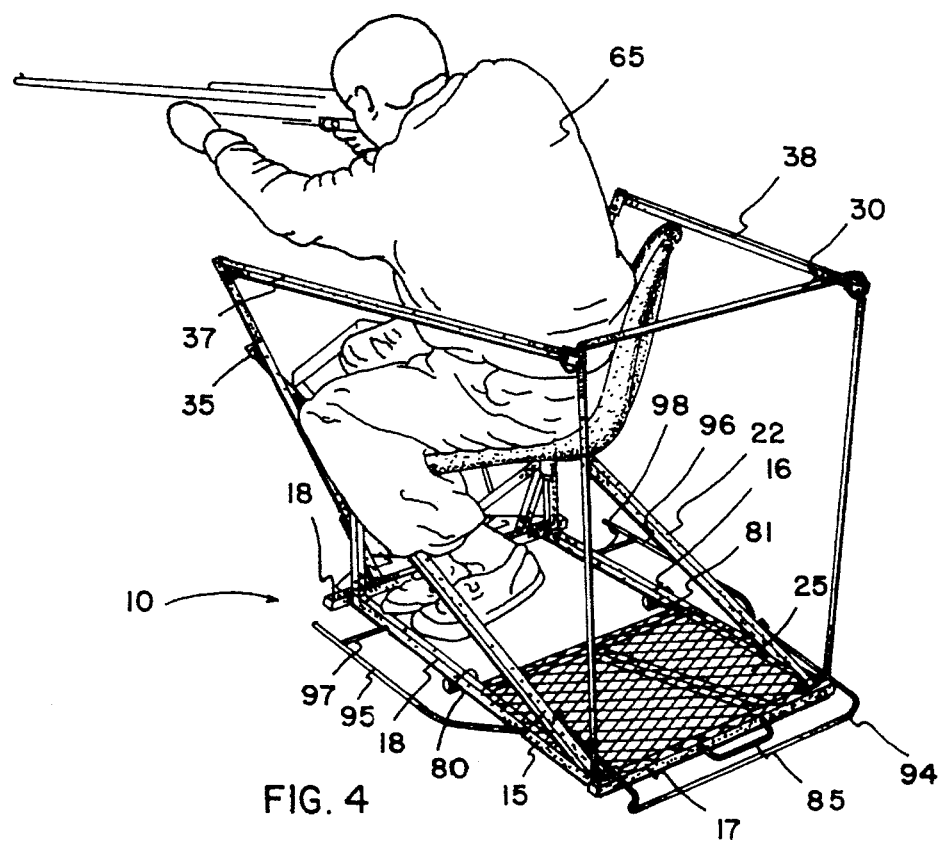
FIG. 4 is a perspective view of the stand of the present invention in use with the user facing to the left.

From the above it can be seen that seat 77 can pivot from side to side, as clearly illustrated in FIG. 2 as well as rotate about the vertical axis of seat rod 79. This pivoting and rotating movement allows the user 65 of the stand 10 to move to the right side of the stand when rotating his seat to the left, and move to the left side of the stand when rotating his seat to the right. Thus it can be seen that 360° view and aiming radius is achieved with no more effort than turning around on a piano stool.

Because of the pivoting movement of seat bracket 70, a much smaller space is required between guard and gun rest rails 37 and 38 than would be required if a piano type stool was fixed in the center of the stand. The reason, obviously, for this is that when the seat is pivoted to one side of the stand, the legs of the user can move freely on the other side of the stand, and vice versa.

To transport the stand 10 of the present invention to its use site as well as using it as a game carrier, either two, four or six wheels can be used. Obviously the heavier the load and the softer the ground being traversed, the greater number of wheels will make the transport easier.

Axially aligned horizontally disposed sleeves 80 and 81 are mounted, by weldment or other suitable means, to the bottom central portion of frames 15 and 16.

Three axle configurations can be provided for use in conjunction with the stand of the present invention. The first axle 82 is adapted to pass through hollow rear frame member 18. This rear axle has a quick release means, such as a quick release pin 83, in at least one end thereof so that said axle can be pushed through one rear wheel 84, through the frame member 18, through the second rear wheel 84, and secured in place by the pin 83. By the same token, the wheels and rear axle can be removed by simply pulling the pin 83, removing the first wheel and then pulling the axle out of the rear frame member.

If only the rear wheels 84 are connected to stand 10, handle 85, mounted by weldment or other suitable means, to front frame 17 can be grasped and such stand transported in a manner similar to a wheel supported golf bag.

A central axle 86 is provided and is adapted to be passed through sleeves 80 and 81 in the same mounting and dismounting manner as that described for axle 82 and its associated wheels 84. With the central axle 86 and its associated wheels 87 in place, a four wheel carrier is provided and with rail/handle 30 disposed in the position shown in FIG. 7, the stand 10 of the present invention can be transported in a manner similar to pulling a child's wagon.

Figure 7:
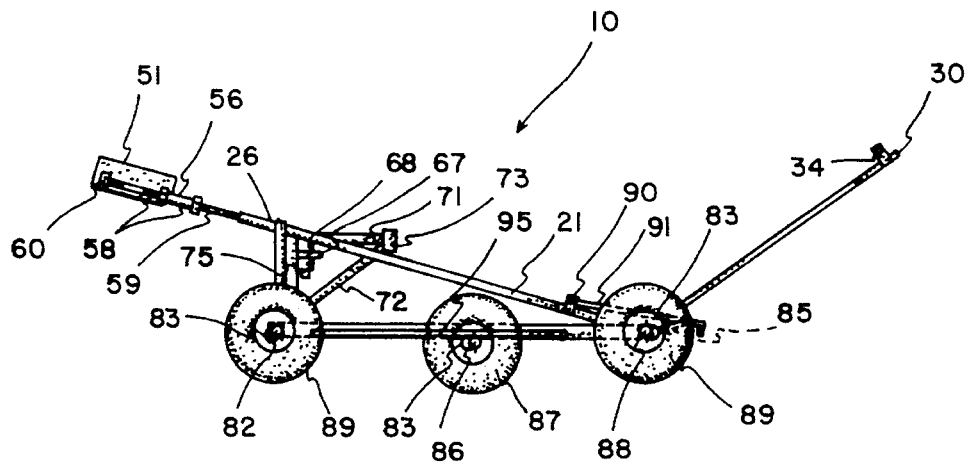
FIG. 7 is a side elevational view of the stand of the present invention with the transport wheels mounted thereon.

A front axle 88 is provided and is adapted to pass through front frame 17 and is mounted in the same manner as rear axle 82 and central axle 86 with said front axle carrying front wheels 89. Since six wheel, three axle vehicles that are not articulated are difficult to turn, particularly sharp turns such as turns that are required to maneuver through woods and around trees, the central axle and its associated wheels are mounted to the bottom of frame 11 while the front and rear axles are mounted through said frame. This arrangement makes the central wheels 87 disposed in a plane lower than the plane that front and rear wheels 89 and 84 are in. Thus it can be seen, as illustrated in FIG. 7, that the six wheel configuration of the present invention can be readily turned by simply balancing the front and rear wheels off the ground and turning the stand on the central wheels. This allows the stand 10 be pivoted effectively about a vertical pivot point that passes through the center of the central axis 86. In other words, the stand can be pivoted within its own length which, of course, is as maneuverable as a vehicle can get.

Upwardly projecting brackets 90 and 91 are secured to support frames 21 and 22, respectively, and have openings therein which engage outwardly projecting ends 92 and 93 of generally U-shaped foot rest extension 94. During transport, this foot rest extension can be pivoted from its use position to a position juxtapose to support frames 21 and 22.

Brush guards 95 and 96 are provided on opposite sides of side frames 15 and 16 and are held in place by brush guard supports 97 and 98 as can clearly be seen in the Figures. The central wheels 87 are disposed inside the brush guards. These brush guards, of course, help prevent brush and other foreign matter from getting between the wheels and the adjacent frame to bind such wheels.

Most climbing tree stands rely on the binding moment between an upper angle member and lower engaging plate to hold the stand in place. Should the user 65 of the stand be moving around and for some reason either take his weight off the stand or tip the front up so that the engaging plate 63 becomes disengaged from the upright support, the stand may freefall. There have been instances where stands have fallen not just a few feet before binding action is re-established, but have fallen all the way to the ground, sometimes a distance of 30 or more feet.

To prevent accidental freefall as described above, a roller 99 having a greater diameter in its ends than at its middle, similar to a boat trailer keel roller, is mounted on an elongated shaft 100. The ends of this shaft are mounted on roller brackets 101 and 102. Each of these brackets has an associated adjustable tensioning means, such as springs 103 and 104, connected thereto. Finally, a hook 105 and 106 is associated with springs 103 and 104 respectively, each of said hooks being adapted to engage rear frame 18 of base portion 11. Adjustments in tension are made by selecting different openings ½ inch in brackets 101 and 102 for engagement of springs 103 and 104

Figure 5:
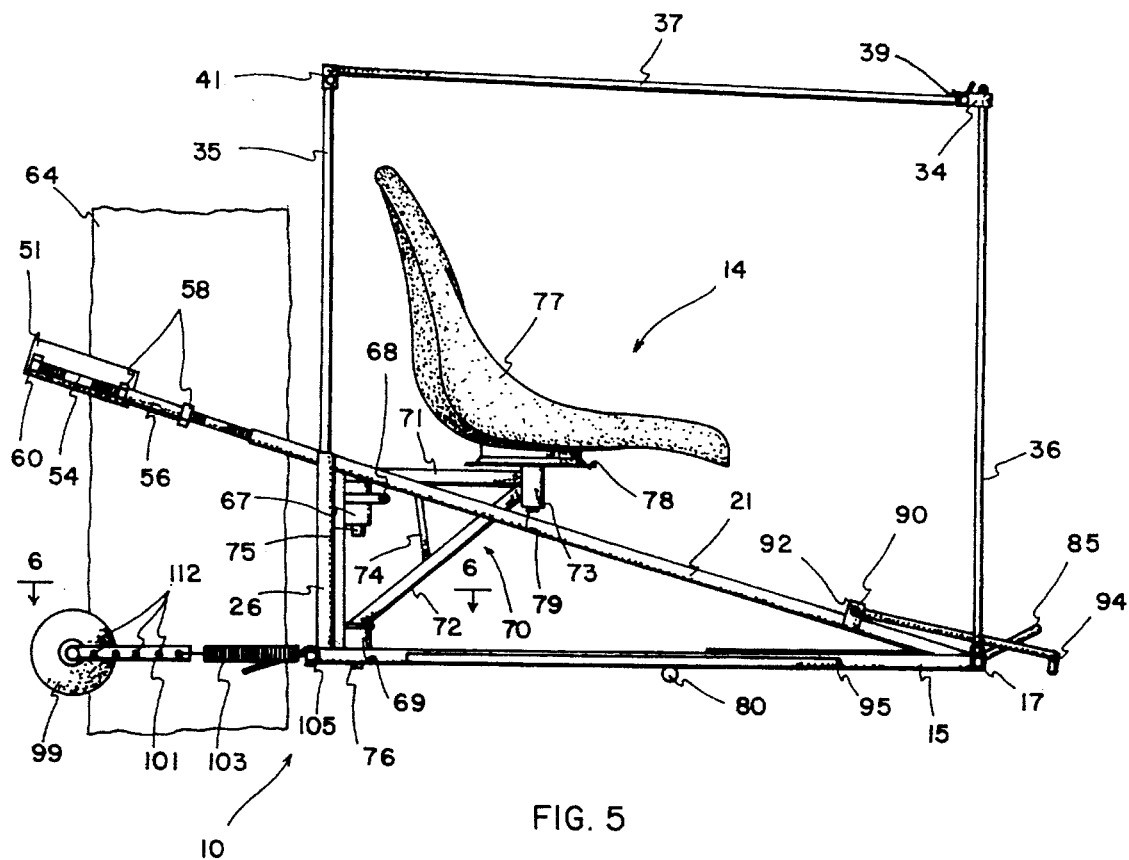
FIG. 5 is a side elevational view of the stand of the present invention showing the anti-freefall device.
Figure 6:
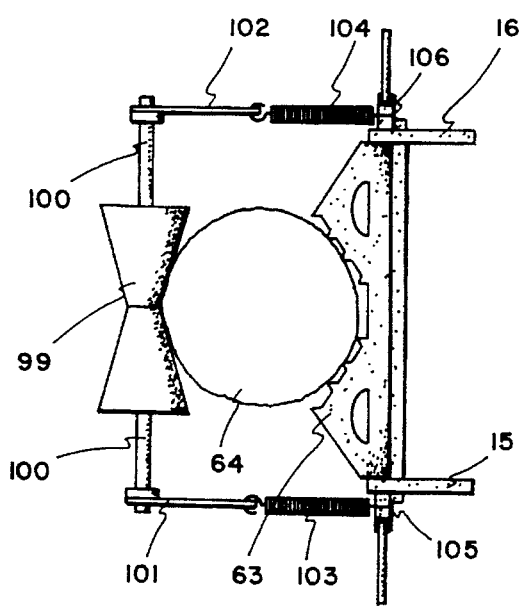
FIG. 6 is a sectional view taken through lines 6—6 of FIG.

From FIGS. 5 and 6 it can be seen that springs 103 and 104 urge, through brackets 101 and 102, roller 99 against the upright support or tree 64. The tension is not so great that the stand cannot be easily moved upwardly and downwardly when the engaging plate 63 is intentionally pulled from engagement with said upright 64. On the other hand, should accidental disengagement of plate 63 from support 64 occur, the tension of the springs 103 and 104 pulling against roller 99 will cause the engaging plate 63 to re-engage the support thereby preventing, or at least limiting to a very short distance, an unintentional free fall.

When it is desired to hide the user 65, or during cold or inclimate weather, a blind 107 can be mounted on rails 37, 38 and rail/handle 30. This blind normally is a fabric material having a tree type camouflage fabric printed thereon.

Should shielding from rain, snow or sun be desired, a camouflaged top fabric 108 is provided with a stiffener 109 in one end thereof with the opposite end having straps 110 that secure to rail/handle 30. A tree or upright support encircling member, such as strap 111, is provided which releasably attaches to stiffener 109. To use the top 108, straps 110 are simply attached to rail/handle 30 and strap 112 encircles supporting tree 64. To remove the top 108 and the blind 107, the attaching process is simply reversed.

The improved tree stand of the present invention utilizes the well-known stand-up/sit-down climbing method with the tree stand 10, as described above, being the upper portion with a lower foot engaging portion (not shown) being used to stand on prior to moving the stand. This method of tree climbing with the stand is well illustrated in the *Gander Mountain* Reference Number 95K9318 on Page 207 for the Trophy Lite Climbing Tree Stand. Since this climbing method and the lower foot platform are well known to those skilled in the art, further detailed discussion of the same is not deemed necessary.

To use the improved tree stand of the present invention, either two, four or six wheels are mounted on the base frame portion 11 as hereinabove described. The stand is then transported through the woods to the location where the same is to be set up and the wheels are removed.

Quick release pins 49 and 50 are then removed from safety bars 45 and 46 and end nuts 60 and 61 are threaded off shafts 54 and 55. Also, the outer nuts of paired sleeve nuts 58 and 59 are removed so that angled bar 51 can be removed from the stand. The engaging plate 63 is then placed adjacent the tree or other upright support 64 and angle bar 51 is replaced on the stand in reverse order from that described for removing the same. The railings 37 and 38 and railing/handle 30 are put in place as described above. The stand is now assembled as shown in FIGS. 2 and 5.

If desired, the anti-freefall roller 99 can be connected to rear frame 18 as hereinabove described.

The standard foot stand (not shown), such as that shown in item 195K9318 of the *Gander Mountain* reference, is mounted on the tree or other upright 64 below the stand 10. The seat 77 is, of course, removed from sleeve 73 of the seat bracket 70 and said seat bracket is pivoted either back against one of the support frames 21 or 22 or can be lifted completely from sleeves 67 and 69 so that opening 24 is clear.

The user then places his body in said opening while standing on the foot stand (not shown) and raises the stand 10 to approximately waist high by tipping the front slightly upwardly. He thereafter sits on platform 25 and pulls the foot stand (not shown) up to a position just below stand 10. He then stands up on said foot stand (not shown) and raises the stand 10 once again to waist high. By repeating this process, the user 65 can climb to the desired height. It should be noted that the repeating tipping of the stand out of engagement with the support 64, sliding it up, and again putting pressure on the front portion thereof to bindingly lock the same in place is the accepted stand-up/sit-down climbing method.

Once the desired height has been reached, the stand extended through opening 24 and seat bracket 70 is placed in sleeves 67 and 69 (if not already so engaged) and the seat rod 79 is placed in sleeve 73 so that the seat 77 is in the position shown in the various Figs.

Figure 8:
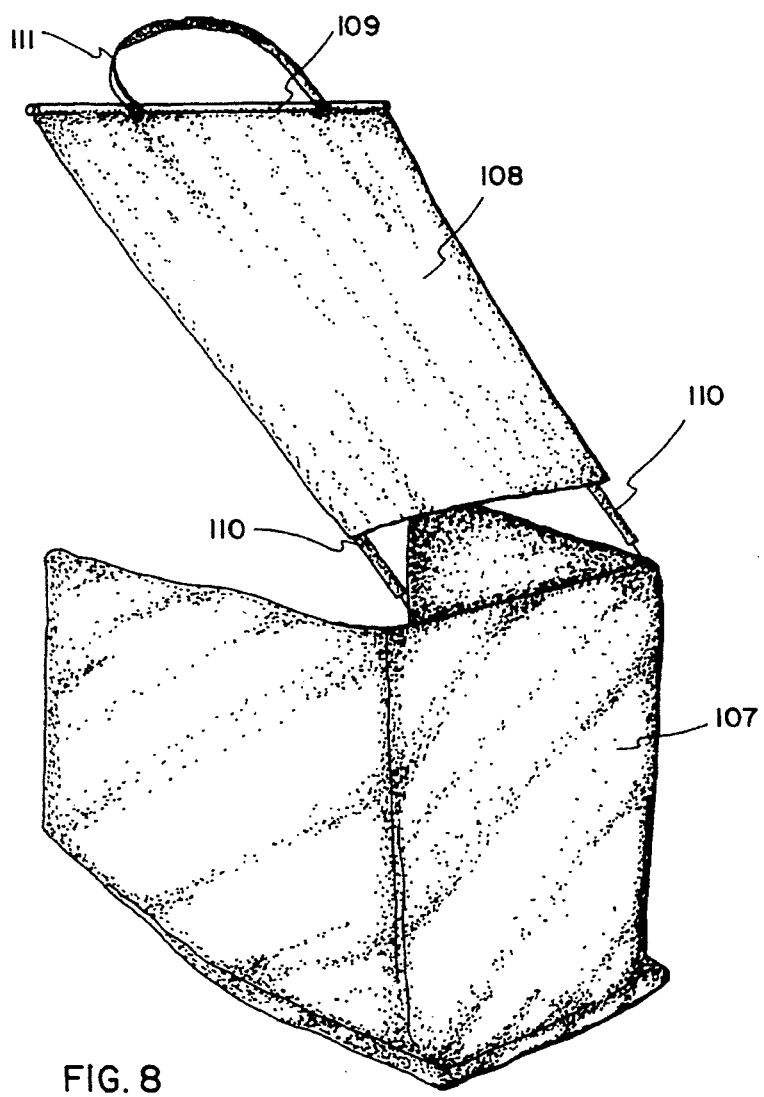
FIG. 8 is a perspective view of the stand of the present invention with the blind and roof attachments in place.

If desired, the blind 107 can be deployed about railings 37 and 38 and railing/handle 30. Also, the top 108 can be stretched from rail/handle 30 with strap 111 encircling the tree or the support 64 as shown in FIG. 8.

If the user 65 wishes to face away from the tree 64, he can so align seat 77. If he wishes to turn to the left, he pivots or swivels the bracket 70 to the right so that the seat is adjacent rail 37. The seat can then be rotated to the left with plenty of room for the legs and feet of the said user. On the other hand, if the user wishes to look to the right side of the tree 64 he pivots the bracket 70 to the left adjacent rail 38 and rotates the seat 77 as far as desired to the right.

All of the above-described swiveling and rotating can be done very slowly, smoothly and quietly so as not to spook any game that may be nearby. This effectively gives the user 65 a 360° view without ever having to leave seat 77.

Whenever it is desired to leave the stand 10 of the present invention, user 65, using the foot stand (not shown) described above, can walk the stand down the tree 64 until ground level is reached The angle bar 51 is then removed from around said tree.

Quick release pins 39 and 40 are removed from rail flanges 33 and 34 and rails 35 and 36 are removed from rail support tubes 26 and 27. Rails 35 and 37 are then folded down juxtaposed to each other as are railings 36 and 38. These railings are then stored on the stand for transport. The foot rest 94 can then folded back juxtaposed to support frames 21 and 22 if desired. The axles that were used in the transport of the stand to its use location are then re-inserted into the base frame 11 and the appropriate wheels mounted thereon.

The next handle 85 or 30 is grasped, depending on the wheel configuration, to move the stand from the woods. If game has been killed, it can be placed on the stand prior to transport out of the woods and the stand thus becomes a game carrier.

From the above it can be seen that the present invention provides a relatively simple and yet highly efficient climbing tree stand that allows the user to smoothly and quietly move from one position to another without leaving his seat while at the same time effectively giving him a 360° field of view. The present invention is also readily transportable to and from its use location and it can be also used as a game carrier without modification.

The terms "front" and "rear," "side," etc. have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out other specific ways than those herein set forth without departing from the spirit and essential characteristics of such invention. The present embodiments are therefore, to be considered in all respects as illustrative and not restrictive, and all changes coming within the meaning and equivalency range of the appended claims are intended to be embraced therein.

What is claimed is:

1. An improved climbing tree stand having a generally horizontally disposed base frame, an elevated angle means mounted on said frame for engaging the rear of an upright support on which said frame is mounted, and an engaging means mounted on said frame for engaging the front of said upright support, the improvement comprising: U-shaped, generally horizontally disposed guard rail means mounted on said stand above and in spaced relation to said base frame; an outwardly extending seat bracket mounted on said stand for swinging about a generally vertical axis above said base frame and within the confines of said guard rail; a seat rotatively mounted on the outer end of said seat bracket to allow the user of the tree stand to swing the seat to the right to a position adjacent the guard rail and rotate on said seat to the left, as well as swing the seat to the left to a position adjacent the opposite side of the guard rail and rotate on said seat to the right to give the user a 360 degree view within the relatively limited confines of the guard rail; and at least three pairs of wheels mounted in tandem on said stand, the end pairs of wheels being disposed in a horizontal plane above the horizontal plane in which the middle pair of wheels are disposed whereby when said stand is balanced with only the center pair of wheels contacting the ground, said stand can be turn within its own length.

2. The improved stand of claim 1 wherein said rails are used as combination guard rails and for support rails.

3. The improved stand of claim 1 wherein said rails are foldable during transport of said stand.

4. The improved stand of claim 1 wherein said wheels are removably mounted on said stand whereby the same can be readily transported to and from its use position and can also be used as a big game carrier.

5. An improved climbing tree stand having a generally horizontally disposed base frame, an elevated angle means mounted on said frame for engaging the rear of an upright support on which said stand is mounted, and an engaging means mounted on said frame for engaging the front of said upright support, the improvement comprising: U-shaped generally, horizontally disposed guard rail means mounted on said stand above and in spaced relation to said base frame; an outwardly extending seat bracket mounted on said stand for swinging about a generally vertical axis above said base frame and within the confines of said guard rail; a seat rotatively mounted on the outer end of said seat bracket to allow the user of the tree stand to swing the seat to the right to a position adjacent the guard rail and rotate on said seat to the left, as well as swing the seat to the left to a position adjacent the opposite side of the guard rail and rotate on said seat to the right to give the user a 360 degree view within the relatively limited confines of the guard rail; and an anti-free fall means including a roller engaging the rear of said upright support for said stand disposed generally in the same horizontal plane as, and spring biased toward, said engaging means whereby should said engaging means become accidentally disengaged from said upright support, said roller will urge said engaging means back into engagement with said upright.

6. The improved stand of claim 5 wherein said rails are used as combination guard rails and gun support rails.

7. The improved stand of claim 5 wherein said rails are foldable during transport of said stand.

* * * * *